United States Patent [19]
Den Hartog

[11] Patent Number: 6,078,651
[45] Date of Patent: Jun. 20, 2000

[54] METHOD AND A SYSTEM FOR PROVIDING SERVICE TO TELECOMMUNICATION SUBSCRIBERS AT LOW TRAFFIC INTENSITY

[75] Inventor: Jos Den Hartog, Capelle a/d Ijssel, Netherlands

[73] Assignee: Telefonaktiebolaget LM Ericsson, Stockholm, Sweden

[21] Appl. No.: 08/992,172

[22] Filed: Dec. 17, 1997

[30] Foreign Application Priority Data

Dec. 18, 1996 [EP] European Pat. Off. .............. 96203645

[51] Int. Cl.$^7$ .................................................. H04M 15/00
[52] U.S. Cl. ........................ 379/113; 379/133; 379/201; 455/405
[58] Field of Search ..................................... 379/113, 133, 379/134, 136, 137, 138, 139, 201; 455/403, 413, 33.1, 33.2, 405

[56] References Cited

U.S. PATENT DOCUMENTS

| | | | |
|---|---|---|---|
| 4,156,109 | 5/1979 | Kraushaar et al. | 379/137 |
| 5,488,655 | 1/1996 | Hamlen | 379/114 |
| 5,594,779 | 1/1997 | Goodman | 455/403 |
| 5,752,186 | 5/1998 | Malackowski et al. | 455/414 |

FOREIGN PATENT DOCUMENTS

| | | | |
|---|---|---|---|
| WO95/30317 | 11/1995 | WIPO | H04Q 7/24 |
| WO96/25012 | 8/1996 | WIPO | H04Q 3/00 |
| WO97/16038 | 5/1997 | WIPO | H04Q 7/22 |

OTHER PUBLICATIONS

European Search Report re: EP 96203645.5 dated Jul. 15, 1997.
Zbigniew Dziong et al., "Adaptive Traffic Admission for Integrated Service in CDMA Wireless–Access Networks", *IEEE Journal on Selected Areas in Communications*, vol.14, No. 9, Dec. 1996, pp. 1737–1747.
Scott Jordan et al., "Control of Multiple Service, Multiple Resource Communication Networks", *IEEE Infocom '91, Networking in the Nineties*, Apr. 7–11, 1991, pp. 648–657.
Kalyan Basu, "Open Network Architecture and Information Services: Teletraffic Challenges", *Computer Networks and ISDN Systems*, vol. 20, No. 1, Dec. 1, 1990, pp. 101–107.

*Primary Examiner*—Paul Loomis
*Attorney, Agent, or Firm*—Burns, Doane, Swecker & Mathis, L.L.P.

[57] ABSTRACT

A method and a system for providing information services to subscribers of a telecommunication network, such as the Public Switched Telephone Network (PSTN) or the Global System for Mobile communications (GSM). Access to the information services is based on the traffic condition of the telecommunication network. An access signal indicating the availability of the information services is generated for receipt by subscribers. The access signal and the information may be transferred in a broadcast mode. The information services may be accessed on demand or automatically. With the invention low traffic hours in the telecommunication network can be made more productive.

22 Claims, 3 Drawing Sheets

METHOD AND A SYSTEM FOR PROVIDING SERVICE TO TELECOMMUNICATION SUBSCRIBERS AT LOW TRAFFIC INTENSITY

FIELD OF THE INVENTION

The invention relates generally to service provision in telecommunication networks and, more particularly, to a method and system for providing information services to subscribers of a telecommunication network, such as the Public Switched Telephone Network (PSTN) or the Global System for Mobile communication (GSM), dependent on the traffic conditions of the particular network.

BACKGROUND OF THE INVENTION

Telecommunication networks are generally designed to meet the required demand for service with minimal blocking. In telecommunication engineering terms like "busy hour" and "low traffic hours" are well known concepts.

Historically, telecommunication networks have been designed to accommodate predetermined blocking percentages, for example 1% during the busy hour. Those skilled in the art will appreciate that telecommunication networks are faced with a certain amount of over-capacity of the telecommunication network during off-peak times.

U.S. Pat. No. 5,488,655 discloses a method and system for flatten out the busy hour demand through the use of variable price incentives. In essence, there is disclosed a method and a system for determining a variable customer usage rate or tariff dependent on the number of available communication links. The traffic condition of the network is measured on a substantially continuous real-time bases. In general, the customers usage rate is more or less inversely proportional to the number of available communication links.

Although this prior art method and system may have an effect in flattening out the busy hour bulges of a typical working day, a more efficient use of the over-capacity of the network during low traffic hours, i.e. the traffic intensity in the network is small compared to its capacity, such as in the early morning hours or during evening and night time can not be achieved therewith.

SUMMARY OF THE INVENTION

It is an object of the present invention to provide a method and a system for a more efficient usage of the traffic handling capacity of telecommunication networks through the provision of information services to subscribers of the telecommunication network and based on the traffic condition of the system.

It is a further object of the present invention to provide such a method and system addressing subscribers.

These and other objects, advantages en features of the present invention are achieved by a method for providing information services to subscribers of a telecommunication network, such as the Public Switched Telephone Network (PSTN) or the Global System for Mobile communications (GSM), comprising the steps of:

determining access to the information services based on the traffic condition of the telecommunication network;

generating a signal indicative of the access to the information services;

providing access to the information services, and transferring information to said subscribers.

Following the invention, information services such as newsletters, advertisements, the contents of (selected) Internet newsgroups, etc. are made accessible to subscribers, dependent on the traffic condition of the telecommunication system.

In accordance with the present invention, the information services can be made accessible at low traffic hours, whether or not in connection with a price incentive, thereby providing an opportunity to make over-capacity of the network productive. Price incentives can be applied in a manner such that during low traffic hours the information services are accessible at a very low charge or even a fixed charge independent of connection time during the idle traffic hours, for example, while the information services can be made available during busy hours, at a (very) high charge. Within the concept of the present invention it is, however, feasible to block access to the information services during busy hours.

In order to cope with geographically dependent traffic conditions, e.g. differences in the busy hour periods of different regions serviced by the telecommunication network, in a further embodiment of the method according to the present invention, the access signal, indicative of the accessibility of the relevant information services is generated for receipt by subscribers or selected subscribers of the telecommunication network, i.e. subscribers in a specific region, specific groups of subscribers such as business subscribers, private subscribers and the like.

The information services can be provided to subscribers individually or in a broadcast mode. Further, the information can be provided in the form of a "short message" service, for example. Such that subscribers need not to access the information services by acknowledging receipt or the like, but rather the information will be transferred once the services are accessible. The selected mode of operation can be made dependent on the type of information service provided or according to the needs of an individually user, for example.

In keeping with the invention, a system is similarly provided for making information services available to subscribers of a telecommunication network, such as the Public Switched Telephone Network (PSTN) or the Global System for Mobile communication (GSM), comprising:

means for determining access to the information services based on the traffic condition of the telecommunication network;

means for generating a signal indicative of the access to the information services;

means for accessing information services, and means for transferring information to a subscriber.

The means for generating the access signal are, in a further embodiment of the system, arranged to generate and transmit the access signal for receipt by a subscriber or (selected) subscribers. The information can be transmitted in a broadcast mode, preferably in a digital signal format.

The traffic condition of the network is, in a preferred embodiment of the invention, determined from actual traffic measurements, using means for measuring the amount of traffic in the network as a whole or on a regional or cellular basis, for example. It is, however, also feasible to determine the traffic condition from statistical, historical traffic data of the network or by combining actual and historical data, such to predict well in advance a traffic condition allowing access to the information services. In the latter case, an access signal can be generated indicating the time at which the information services are available, for example.

The above-mentioned and other features and advantages of the present invention will now be discussed in the following description with reference to the accompanying drawings.

DETAILED DESCRIPTION OF THE EMBODIMENTS

Figure 1:
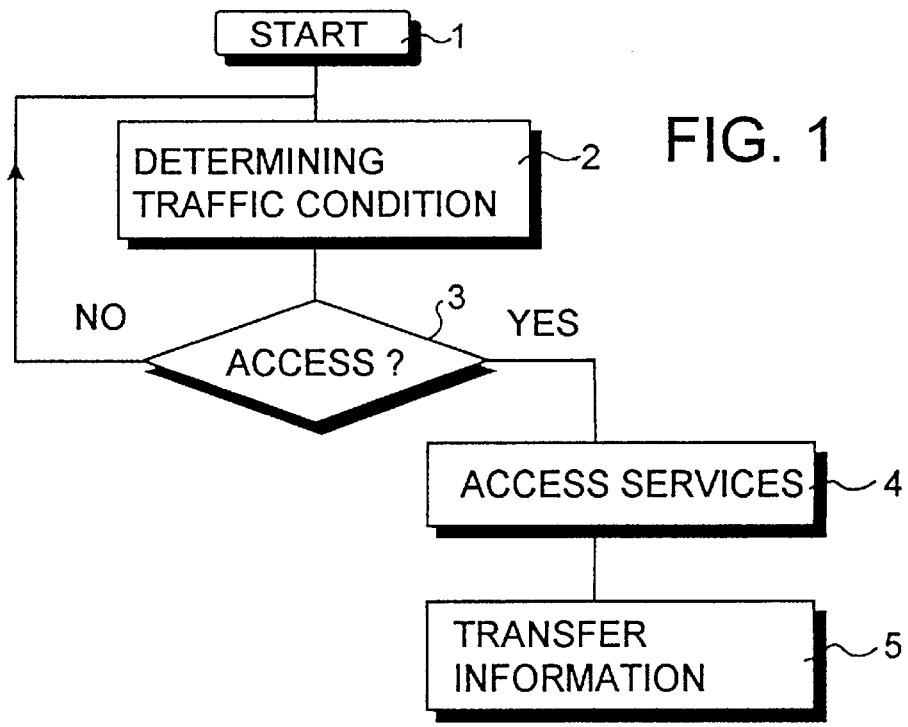
FIG. 1 shows a flow chart diagram illustrating the principals of the method according to the present invention.

FIG. 1 shows a simplified flow chart diagram illustrating the main principle of the method for providing information services to subscribers of a telecommunication network, in accordance with the present invention. In this flow chart diagram it is assumed that the flow direction is from the top of the chart, i.e. block 1 indicated with "START" to the bottom of the chart. Any flow other than the assumed direction is indicated with an arrow.

In accordance with the present invention, the traffic condition of the network is determined, as indicated by block 2 "DETERMINING TRAFFIC CONDITION". The traffic condition of the network can be calculated from actual, continuous real time measurement of the number of calls handled by the network exchanges, from statistical and historical traffic data and/or a combination of both. The traffic condition can be monitored on a national, regional or even local basis. The latter, for example, if the information services provide local information such as advertisements or news letters from local governmental or commercial bodies.

From the traffic condition determined, a signal indicative of the access to the information services is generated, for example a signal indicating the availability of the information services.

In decision block 3 "ACCESS" it is determined whether the information services can be accessed or not. In a case of a "NO" decision, access to the relevant information services is inhibited. If the decision is "YES", the relevant services can be accessed by subscribers of the network as indicated by block 4 "ACCESS SERVICES". Block 5 "TRANSFER INFORMATION" completes the transfer of information to the subscribers.

Access to the service, i.e. block 4, can be controlled from a number of different aspects in accordance with the present invention. Access to the information can be accompanied by price incentives, for example, relating to the determined traffic conditions, the duration of the access, etc. Further, access can be limited to a number of information services whether or not in connection with price incentives.

The information can be transferred to subscribers, i.e. block 5, in a broadcast mode or in a group mode or an individual mode, for example. Within the present invention, the link to the subscribers can be automatically set up from block 4 or by the subscribers themselves. In the first case, information can be transferred independently of the receipt of acknowledgement data or the like from subscribers. Information can be transferred through a communication link set up with a subscriber or even via a signalling link, if available.

Figure 2:
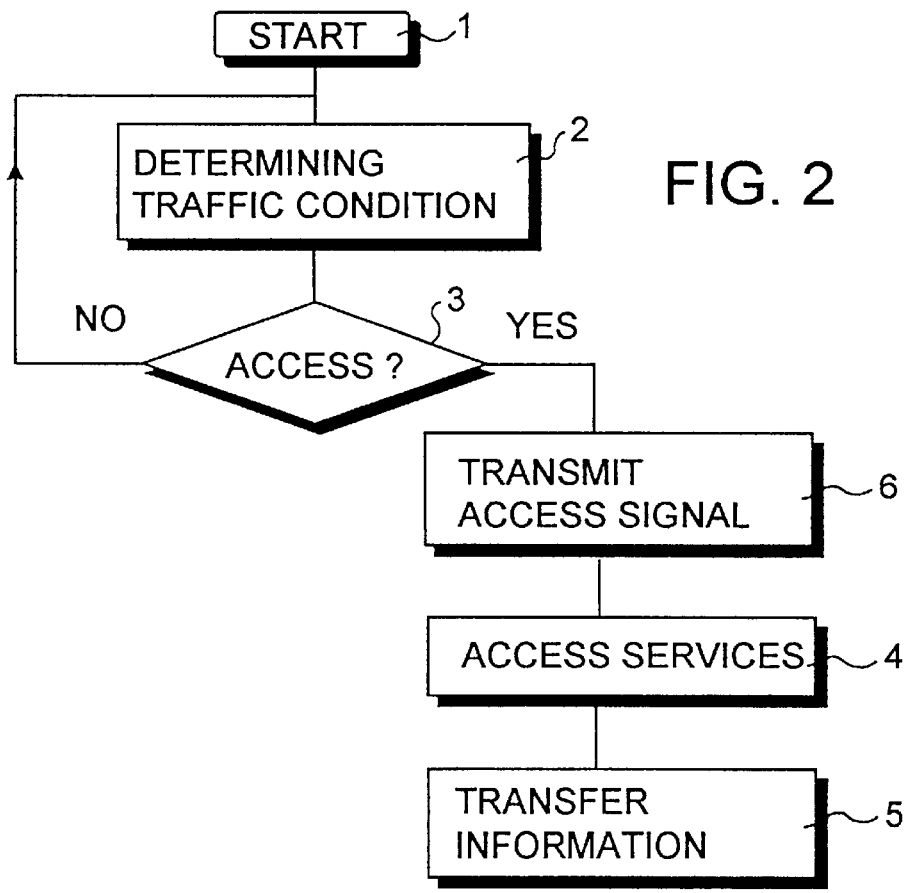
FIG. 2 shows a flow chart diagram illustrating a further embodiment of the method according to the present invention.

FIG. 2 shows a further embodiment of the method according to the invention, wherein access to the information services is signalled to subscribers by means of block 6 "TRANSMIT ACCESS SIGNAL". Receipt of the access signal at the subscriber terminal can result in a automatic receipt of relevant information, for example programmed in advance, or in an indication to the user by means of the display of a relevant message, an audio signal or any other indication recognisable by a subscriber.

The access signal in block 6 may be transmitted to individual subscribers, to groups of subscribers or in a broadcast mode.

Figure 3:
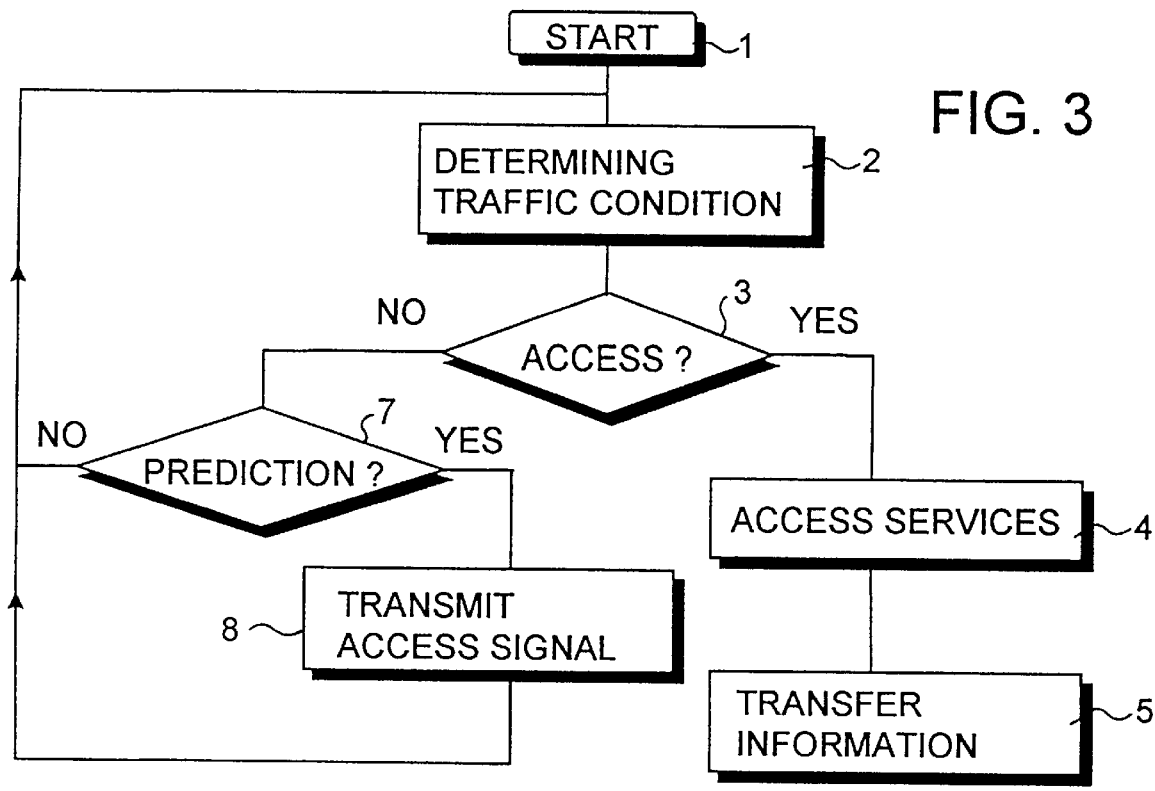
FIG. 3 shows a flow chart diagram illustrating an advanced embodiment of the method according to the present invention.

An advance embodiment of the method according to the present invention is illustrated in FIG. 3.

Following this method, in block 2 access to the information services is determined on the actual traffic conditions of the network and from historical and/or statistical traffic data, such to provide access to the information services in order to avoid congestion in the network. Further, by analysing the actual measured or calculated traffic data and the historical and statistical traffic data of the network, a prediction signal can be generated, such to provide information to subscribers at what time and/or for how long the relevant information services can be accessed. This is illustrated by block 7 "PREDICTION". If a prediction signal is generated, i.e. decision "YES", an access signal relevant to the prediction is transmitted for receipt by subscribers. Otherwise, i.e. decision "NO", traffic conditions are further monitored. Once an access signal has been provided, i.e. decision block 3, decision "YES", access to the information services can be provided as described above.

The method according to the present invention provides an operator of a telephone network a unique possibility to make over-capacity of the network during low traffic hours or idle traffic hours productive, for example by defining a plurality of sources of information in digital format. A subscriber having a telephone, modem and Personal Computer (PC), for example, can subscribe to such an information source. Transfer of the information is permitted during hours with low traffic intensity only, or even during busy hour however with a price incentive, for example. This up to the decision of an operator.

Figure 4:
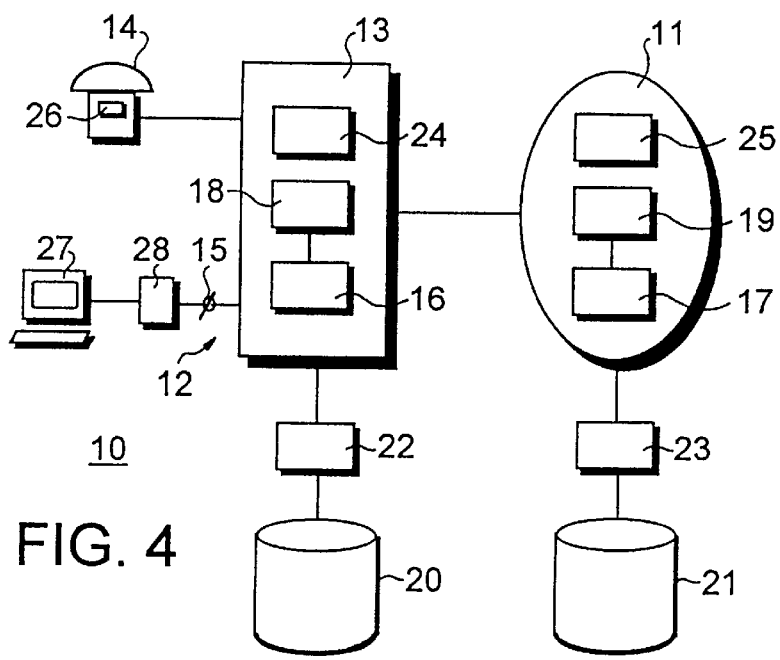
FIG. 4 shows, in a schematic and illustrative manner, a system according to the present invention, for providing information services to subscribers of the Public Switched Telephone Network (PSTN).

FIG. 4 shows the system according to the invention, applied in a telecommunication network such as the Public Switched Telephone Network (PSTN) 10. Those skilled in the art will appreciate that the PSTN is generally comprised of a trunk network 11 and a local network 12, comprising a local exchange 13 to which a plurality of subscribers 14, 15 connect.

In accordance with the invention, means 16 for determining access to information services based on the traffic in the telecommunication network are provided. In the embodiment shown, these traffic monitoring means 16 are incorporated in the local exchange 13, providing local traffic monitoring. However, in the case of global traffic determination, means 17 for determining the traffic condition in the complete network 10 can be provided. The means 17 may operatively connect to the traffic monitoring means 16 in a local exchange 13.

The traffic monitoring means 16, 17 connect to means 18 respectively 19 for generating a signal indicative of the access to information services. The generator means 18, 19 can, however, also be incorporated in the corresponding traffic monitoring means 16, 17.

In the embodiment shown, the information services can be accessed from a local data base 20, operatively connecting to the local exchange 13 and/or from a global data base 21, operatively connecting to the trunk network 11. Once the information services are available, the relevant data bases 20, 21 are accessed through means 22, 23 respectively.

Information retrieved from either one or both of the local data base 20 and the global data base 21 is transferred from the network 10 to the individual subscribers 14, 15 or only to subscribers which have a subscription to a relevant information service. In accordance with the present invention, the information is preferably transmitted in a digital data format, individually or in a broadcast mode, by appropriate control of data transfer means 24, 25.

Traffic monitoring and measurement is well known in the art of telecommunication networking and needs not to be further described herein.

As illustrated, the subscriber equipment 14 can be provided with display means 26, for displaying an access signal transferred for receipt by a subscriber. For example, a display 26 on a conventional telephone device. Reference number 27 denotes subscriber equipment taking the form of a Personal Computer (PC) connected to the subscriber terminal 15 via a modem 28. This is a typical configuration suitable for automatic receipt of information from information services transmitted in an individual or in a broadcast mode following a digital data format.

Those skilled in the art will appreciate that the various means 16, 18, 22, 24 and 17, 19, 23 and 25 can be existing hardware in a local exchange 13 or an exchange being part of the trunk network 11. The data bases 20, 21 may also form part of an existing network.

Figure 5:
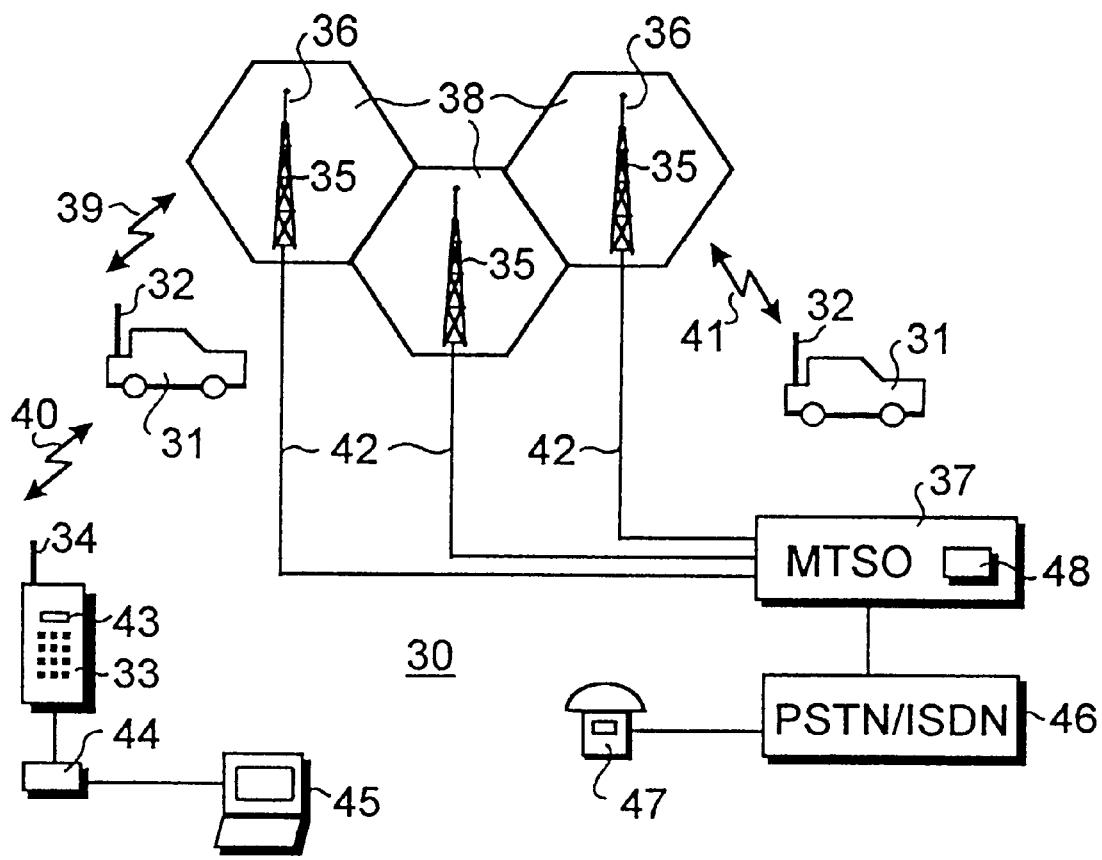
FIG. 5 shows, in a schematic and illustrative manner, a system according to the present invention, for providing information services to subscribers of the Global System for Mobile communication (GSM).

FIG. 5 shows the system according to the present invention incorporated in a typical cellular mobile telecommunication system, generally designated by reference number 30. The system 30 includes one or more mobile radio stations or units 31, 33, shown in the form of a car respectively a portable telephone, one or more radio base stations 35, illustratively shown in the form of a tower, and a radio exchange or Mobile Telephone Switching Office (MTSO) 37.

Each mobile radio unit 31, 33 comprises a transceiver unit (not shown), one end of which is connected to a receive/transmit antenna 32, 34 and an other end is connected to a microphone/loudspeaker arrangement for voice communication (not shown) or a data interface 44 for the connection of a personal computer in the form of a laptop 45 for example. The radio telephone 33 further comprises display means 43.

Each radio base station 35 comprises a radio transceiver unit (not shown), the transceiver output of which is connected to a receive/transmit antenna 36, and provides service to a cell 38. The radio base stations 35 connect via wire or cable 42 to the MTSO 37 which, in turn, connects to a network 46, such as the PSTN or an Integrated Services Digital Network (ISDN) providing service to landline subscribers, represented by a wired telephone 47. Via the cellular network 30 a duplex radio communication link 39, 40, 41 may be effected between mobile stations 31, 33 or between a mobile station 31, 33 and a landline subscriber 47.

Although only three cells 38 are shown in FIG. 5, a typical cellular network may comprise hundreds of base stations 35, thousands of mobile stations 31, 33 and more than one MTSO 37.

The method according to the present invention can be put into operation in either the MTSO 37, by providing relevant equipment 16, 18, 20, 22, 24, schematically indicated by block 48 or in the PSTN/ISDN 46 as described above in connection with FIG. 4.

The present invention is not limited to public telecommunication networks, but may also be applied in "large" private digital or analogue telecommunication networks.

I claim:

1. A method for providing information services to subscribers of a telecommunication network in addition to other traffic handled by said telecommunication network, comprising the steps of:

determining whether access to said information services is permitted, based on a traffic condition associated with said other traffic of the telecommunication network;

generating an access signal indicative of access to said information services;

selectively providing access to said information services based on said access signal; and transferring information to said subscribers.

2. A method according to claim 1, wherein said access signal only indicates the availability of said information services during low traffic hours of said telecommunication network.

3. A method according to claim 1, wherein said access signal is generated for receipt by subscribers.

4. A method according to claim 3, wherein said access signal is a broadcast signal.

5. A method according to claim 1, wherein said information is transferred in a broadcast mode.

6. A method according to claim 1, wherein said information is transferred in a digital data format.

7. A system for providing information services to subscribers of a telecommunication network in addition to other traffic handled by said telecommunication network, comprising the steps of:

means for determining whether access to said information services is permitted, based on a traffic condition associated with said other traffic of the telecommunication network;

means for generating an access signal indicative of access to said information services;

means for selectively providing access to said information services based on said access signal; and means for transferring information to said subscribers.

8. A system according to claim 7, wherein said means for determining access to said information services comprise traffic measuring means for measuring the amount of traffic in the telecommunication system.

9. A system according to claim 7, wherein said means for generating said access signal comprise transmission means for transmitting said access signal for receipt by subscribers.

10. A system according to claim 7, wherein said means for transferring said information to said subscribers comprise transmission means for transferring said information in a broadcast mode.

11. The method of claim 1, wherein said telecommunication network includes at least one of a PSTN and a radiocommunication system.

12. The method of claim 1, wherein said information services include one of newsletters, advertisements, and Internet newsgroups.

13. The method of claim 1, wherein said other traffic includes a number of calls handled by network exchanges.

14. The method of claim 1, wherein said access signal indicates a price associated with accessing said information service.

15. The system of claim 7, wherein said telecommunication network includes at least one of a PSTN and a radio-communication system.

16. The system of claim 7, wherein said information services include one of newsletters, advertisements, and Internet newsgroups.

17. The system of claim 7, wherein said other traffic includes a number of calls handled by network exchanges.

18. The system of claim 7, wherein said access signal indicates a price associated with accessing said information service.

19. A method for providing information services to subscribers of a telecommunication network, comprising the steps of:

provilling traffic communication services to said subscribers;

determining a capacity of said telecommunication network based on said provided traffic communication services;

generating an access signal associated with at least one information service based on said determined capacity; and selectively providing information from said at least one information service to at least one subscriber based on said access signal.

20. The method of claim 19, wherein said step of determining further comprises using actual measurements.

21. The method of claim 19, wherein said step of determining equals using historical projections.

22. The method of claim 19, wherein said step of determining further comprises using a combination of actual measurements and historical projections.

* * * * *